(12) United States Patent
Trainer et al.

(10) Patent No.: US 8,867,244 B2
(45) Date of Patent: Oct. 21, 2014

(54) HVDC CONVERTER INCLUDING FULLBRIDGE CELLS FOR HANDLING A DC SIDE SHORT CIRCUIT

(75) Inventors: David Reginald Trainer, Derbyshire (GB); William Crookes, Staffordshire (GB); Timothy Charles Green, Sussex (GB); Michael Marc Claude Merlin, Dourdan (FR)

(73) Assignee: Alstom Technology Ltd., Baden (CH)

( * ) Notice: Subject to any disclaimer, the term of this patent is extended or adjusted under 35 U.S.C. 154(b) by 47 days.

(21) Appl. No.: 13/813,414

(22) PCT Filed: Jul. 30, 2010

(86) PCT No.: PCT/EP2010/061145
§ 371 (c)(1),
(2), (4) Date: Jan. 30, 2013

(87) PCT Pub. No.: WO2012/013248
PCT Pub. Date: Feb. 2, 2012

(65) Prior Publication Data
US 2013/0128636 A1    May 23, 2013

(51) Int. Cl.
| | |
|---|---|
| H02J 1/10 | (2006.01) |
| H02J 3/36 | (2006.01) |
| H02J 5/00 | (2006.01) |
| H02M 1/32 | (2007.01) |
| H02M 7/797 | (2006.01) |
| H02J 3/18 | (2006.01) |
| H02M 7/483 | (2007.01) |

(52) U.S. Cl.
CPC .. H02J 5/00 (2013.01); Y02E 40/26 (2013.01); Y02E 60/60 (2013.01); H02M 1/32 (2013.01); H02M 7/797 (2013.01); Y02E 40/16 (2013.01); H02J 3/36 (2013.01); H02M 2007/4835 (2013.01); H02J 3/1857 (2013.01)
USPC .............................................. 363/65; 363/35

(58) Field of Classification Search
CPC ........... H02M 7/06; H02M 1/12; H02M 7/21; H02M 7/217; H02M 7/2176; H02M 2001/12; H02M 2007/217
USPC ................... 363/35–39, 44, 65–68, 125–132; 323/205–208, 266
See application file for complete search history.

(56) References Cited

U.S. PATENT DOCUMENTS

| | | |
|---|---|---|
| 3,867,643 A | 2/1975 | Baker |
| 4,053,820 A | 10/1977 | Peterson et al. |

(Continued)

FOREIGN PATENT DOCUMENTS

| | | |
|---|---|---|
| DE | 195 35 552 A1 | 4/1996 |
| DE | 10103031 A1 | 7/2002 |

(Continued)

OTHER PUBLICATIONS

Qahraman, B. et al., "A VSC Based Series Hybrid Converter for HVDC Transmission", IIEE 0-7803-8886-0-05 CCECE/CCGEI, Saskatoon, May 2005, pp. 458-461.

(Continued)

Primary Examiner — Timothy J Dole
Assistant Examiner — Yusef Ahmed
(74) Attorney, Agent, or Firm — Nixon Peabody LLP

(57) ABSTRACT

A power electronic converter for use in high voltage direct current power transmission and reactive power compensation comprises three converter limbs, each converter limb including first and second DC terminals for connection in use to a DC network and an AC terminal for connection in use to a respective phase of a three-phase AC network, each converter limb defining first and second limb portions being connected in series between the respective AC terminal and a respective one of the first and second DC terminals, each limb portion including at least one switching element being controllable in use to facilitate power conversion between the AC and DC networks, the power electronic converter further including a plurality of auxiliary units, each auxiliary unit being operably associated with the respective phase of the AC network, each auxiliary unit including at least one module including a voltage source, the limb portions being controllable in use to define at least one three-phase static synchronous compensator including at least one of the plurality of auxiliary units in each branch of a star configuration, each of the first and/or second DC terminals defining the neutral point of the respective star configuration.

28 Claims, 10 Drawing Sheets

(56) References Cited

U.S. PATENT DOCUMENTS

| | | | |
|---|---|---|---|
| 4,663,702 A | 5/1987 | Tanaka | |
| 4,816,736 A | 3/1989 | Dougherty et al. | |
| 5,093,583 A | 3/1992 | Mashino et al. | |
| 5,345,375 A * | 9/1994 | Mohan | 363/40 |
| 5,499,178 A * | 3/1996 | Mohan | 363/39 |
| 5,515,264 A | 5/1996 | Stacey | |
| 5,532,575 A | 7/1996 | Ainsworth | |
| 5,644,482 A | 7/1997 | Asplund | |
| 5,673,189 A | 9/1997 | Schettler | |
| 5,719,486 A | 2/1998 | Taniguchi et al. | |
| 5,726,557 A | 3/1998 | Umeda et al. | |
| 5,889,667 A | 3/1999 | Bernet | |
| 5,892,677 A * | 4/1999 | Chang | 363/152 |
| 5,936,855 A * | 8/1999 | Salmon | 363/46 |
| 5,999,422 A | 12/1999 | Goransson et al. | |
| 6,134,126 A | 10/2000 | Ikekame et al. | |
| 6,236,580 B1 | 5/2001 | Aiello et al. | |
| 6,301,130 B1 | 10/2001 | Aiello et al. | |
| 6,320,767 B1 | 11/2001 | Shimoura et al. | |
| 6,392,348 B1 | 5/2002 | Dougherty | |
| 6,879,062 B2 | 4/2005 | Oates | |
| 6,987,680 B2 | 1/2006 | Vire et al. | |
| 7,170,767 B2 * | 1/2007 | Bixel | 363/65 |
| 7,274,576 B1 | 9/2007 | Zargari et al. | |
| 7,292,462 B2 | 11/2007 | Watanabe et al. | |
| 7,298,115 B2 | 11/2007 | Nishimura et al. | |
| 7,499,291 B2 | 3/2009 | Han | |
| 7,622,825 B2 * | 11/2009 | Brune et al. | 307/82 |
| 8,188,720 B2 | 5/2012 | Kim et al. | |
| 8,390,259 B2 | 3/2013 | Dommaschk et al. | |
| 8,599,591 B2 | 12/2013 | Crookes et al. | |
| 2003/0202367 A1 | 10/2003 | Schreiber | |
| 2004/0218318 A1 | 11/2004 | Bijlenga et al. | |
| 2005/0127853 A1 * | 6/2005 | Su | 318/108 |
| 2005/0135126 A1 | 6/2005 | Gazel et al. | |
| 2005/0146226 A1 | 7/2005 | Trainer et al. | |
| 2008/0002443 A1 | 1/2008 | Ueda et al. | |
| 2008/0007978 A1 * | 1/2008 | Han | 363/35 |
| 2008/0179951 A1 * | 7/2008 | Brune et al. | 307/31 |
| 2008/0205093 A1 | 8/2008 | Davies et al. | |
| 2008/0310205 A1 | 12/2008 | Hiller | |
| 2009/0027934 A1 | 1/2009 | Bustos | |
| 2009/0085548 A1 | 4/2009 | Suh et al. | |
| 2009/0102436 A1 | 4/2009 | Valderrama et al. | |
| 2009/0206781 A1 * | 8/2009 | Itoh et al. | 318/400.3 |
| 2010/0067266 A1 | 3/2010 | Dommaschk et al. | |
| 2010/0118578 A1 * | 5/2010 | Dommaschk et al. | 363/127 |
| 2010/0309698 A1 | 12/2010 | Asplund et al. | |
| 2011/0018481 A1 | 1/2011 | Hiller | |
| 2011/0205768 A1 | 8/2011 | Svensson | |
| 2011/0260701 A1 | 10/2011 | Horger et al. | |
| 2012/0026767 A1 * | 2/2012 | Inoue et al. | 363/89 |
| 2012/0069610 A1 | 3/2012 | Trainer et al. | |
| 2012/0113699 A1 | 5/2012 | Crookes et al. | |
| 2012/0120697 A1 * | 5/2012 | Cuk | 363/126 |
| 2012/0127766 A1 * | 5/2012 | Crookes et al. | 363/126 |
| 2012/0170338 A1 | 7/2012 | Trainer et al. | |
| 2012/0182771 A1 * | 7/2012 | Trainer et al. | 363/51 |
| 2012/0188803 A1 | 7/2012 | Trainer et al. | |
| 2013/0026841 A1 | 1/2013 | Hosini et al. | |
| 2013/0051105 A1 | 2/2013 | Wang et al. | |
| 2013/0094264 A1 | 4/2013 | Crookes et al. | |
| 2013/0119970 A1 | 5/2013 | Trainer et al. | |
| 2013/0128629 A1 | 5/2013 | Clare et al. | |
| 2013/0182467 A1 | 7/2013 | Cross et al. | |
| 2013/0194838 A1 * | 8/2013 | Jang et al. | 363/37 |
| 2013/0208514 A1 * | 8/2013 | Trainer et al. | 363/35 |
| 2013/0208521 A1 * | 8/2013 | Trainer et al. | 363/126 |
| 2013/0279211 A1 * | 10/2013 | Green et al. | 363/35 |
| 2014/0098575 A1 | 4/2014 | Whitehouse | |
| 2014/0146583 A1 | 5/2014 | Trainer et al. | |

FOREIGN PATENT DOCUMENTS

| | | |
|---|---|---|
| EP | 1 800 391 A2 | 6/2007 |
| GB | 2 294 821 A | 5/1996 |
| GB | 2 418 079 A | 3/2006 |
| WO | 97/02639 | 1/1997 |
| WO | 02063758 A1 | 8/2002 |
| WO | 03/055048 | 7/2003 |
| WO | 2007/028349 A1 | 3/2007 |
| WO | 2007/028350 A1 | 3/2007 |
| WO | 2008/086760 A1 | 7/2008 |
| WO | 2009/149743 | 12/2009 |
| WO | 2010025758 A1 | 3/2010 |
| WO | 2010/069371 | 6/2010 |
| WO | 2010/088969 | 8/2010 |
| WO | 2010/145688 A1 | 12/2010 |
| WO | 2010/145689 | 12/2010 |
| WO | 2010/145690 A1 | 12/2010 |
| WO | 2010149200 A1 | 12/2010 |
| WO | 2011012171 A1 | 2/2011 |
| WO | 2011012174 A1 | 2/2011 |
| WO | 2011/050847 A1 | 5/2011 |
| WO | 2011/098117 A1 | 8/2011 |
| WO | 2011/113471 A1 | 9/2011 |
| WO | 2011/124258 A1 | 10/2011 |
| WO | 2011/127980 | 10/2011 |
| WO | 2011/157300 | 12/2011 |
| WO | 2012/167826 | 12/2012 |
| WO | 2013/000510 | 1/2013 |

OTHER PUBLICATIONS

Su, Gui-Jia et al., "Multilevel DC Link Inverter for Brushless Permanent Magnet Motors with Very Low Inductance", Prepared by Oak Ridge National Laboratory for U.S. Dept. of Energy, 2001, IEEE 0-7803-7116-X/01, pp. 829-834.

Wong, C. et al., "Feasibility Study of AC and DC-Side Active Filters for HDVC Converter Terminals", IEEE Transactions on Power Delivery, vol. 4, No. 4, Oct. 1989, New York, NY, USA, pp. 2067-2075.

Zhang, W. et al., "Active DC Filter for HVDC Systems", IEEE Computer Applications in Power, vol. 7, No. 1, Jan. 1994, New York, USA, pp. 40-44.

PCT International Preliminary Report on Patentability in International Application No. PCT/EP2009/057388, mailed on Dec. 14, 2011.

PCT International Preliminary Report on Patentability in International Application No. PCT/EP2009/059973, mailed on Oct. 5, 2011.

PCT International Preliminary Report on Patentability in International Application No. PCT/EP2010/051572, mailed on Apr. 20, 2012.

PCT International Preliminary Report on Patentability in International Application No. PCT/EP2010/053290, mailed on Apr. 20, 2012.

PCT International Search Report and Written Opinion in International Application No. PCT/EP2010/054660, mailed on Feb. 24, 2011.

PCT International Preliminary Report on Patentability in International Application No. PCT/EP2010/054660, mailed on Jun. 6, 2012.

PCT International Search Report for International Application No. PCT/EP2010/054974, mailed on Mar. 4, 2011.

PCT International Preliminary Report on Patentability in International Application No. PCT/EP2010/054974, mailed on Aug. 10, 2012.

PCT International Search Report and Written Opinion in International Application No. PCT/EP2010/058630, mailed on Apr. 19, 2011.

PCT International Preliminary Report on Patentability in International Application No. PCT/EP2010/058630, mailed on Dec. 19, 2012.

PCT International Preliminary Report on Patentability in International Application No. PCT/EP2010/061145, mailed on Aug. 20, 2012.

PCT International Search Report and Written Opinion in International Application No. PCT/EP20111059514, mailed on Jul. 5, 2012.

(56) References Cited

OTHER PUBLICATIONS

PCT International Preliminary Report on Patentability in International Application No. PCT/EP2011/059514, mailed on Aug. 1, 2013.
PCT International Search Report and Written Opinion in International Application No. PCT/EP2011/060907, mailed on Jul. 16, 2012.
PCT International Preliminary Report on Patentability in International Application No. PCT/EP2011/060907, mailed on Sep. 24, 2013.
Office Action in U.S. Appl. No. 13/388,277, mailed on Nov. 22, 2013.
Notice of Allowance in U.S. Appl. No. 13/378,336, mailed on Feb. 6, 2014.
Notice of Allowance in U.S. Appl. No. 13/380,500, mailed on Jul. 31, 2013.
Notice of Allowance in U.S. Appl. No. 13/576,920, mailed on Dec. 4, 2013.
U.S. Appl. No. 14/129,923.
Allebrod, S. et al., "New Transformerless, Scalable Modular Multilevel Converters for HVDC—Transmission", Power Electronics Specialists Conference, IEEE, Jun. 15, 2007, pp. 174-179.
Hagiwara, Makoto et al., "PWM Control and Experiment of Modular Multilevel Converters", Power Electronics Specialists Conference, PESC 2008, IEEE, Piscataway, NJ, USA, pp. 154-161, (2008).
Knudsen, L. et al., "Description and Prospective Applications of New Multi-Terminal HVDC System Concepts", CIGRE Conf. Internationale Des Grands Reseaux Electriques, Aug. 26-Sep. 1, 1990, pp. 1-11.
Glinka M., "Prototype of Multiphase Modular-Multilevel-Converter with 2MW Power Rating and 17-Level-Output-Voltage", 2004 35th Annual IEEE Power Electronics Specialists Conference, Jun. 20-25, 2004, pp. 2572-2576.
Lesnicar, A. et al., "A New Modular Voltage Source Inverter Topology", pp. 1-10, (2003), XP002454302.
Lesnicar, A. et al., "An Innovative Modular Multilevel Converter Topology Suitable for a Wide Power Range", 2003 IEEE Bologna PowerTech Conference, Jun. 23-26, 2003, pp. 1-6.
Raju, N. Ravisekhar, "A DC Link-Modulated Three-Phase Converter", IEEE, pp. 2181-2185, (2001), XP010561989.
PCT International Search Report and Written Opinion in International Application No. PCT/EP2010/053290, mailed on Feb. 11, 2011.
PCT International Search Report and Written Opinion in International Application No. PCT/EP2010/051572, mailed on Jan. 19, 2011.
PCT International Search Report and Written Opinion in International Application No. PCT/EP2009/057388, mailed on Mar. 18, 2010.
PCT International Search Report and Written Opinion in International Application No. PCT/EP2009/057736, mailed on Mar. 26, 2010.
PCT International Search Report and Written Opinion in International Application No. PCT/EP2009/059973, mailed on Aug. 13, 2010.
PCT International Preliminary Report on Patentability in International Application No. PCT/EP2009/057736, mailed on Nov. 24, 2011.
Notice of Allowance in U.S. Appl. No. 13/380,500, mailed on Jun. 11, 2013.
U.S. Appl. No. 13/576,920.
U.S. Appl. No. 13/639,844.
U.S. Appl. No. 13/805,333.
Notice of Allowance in U.S. Appl. No. 13/576,920, mailed on Mar. 20, 2014.
Baran, M. E. et al., "Overcurrent Protection in DC Zonal Shipboard Power Systems uisng Solid State Protection Devices", Electric Ship Technologies Symposium, 2007. ESTS '07. IEEE, IEEE, PI, May 1, 2007, pp. 221-224.
Guanjun Ding, et al., "New Technologies of Voltage Source Converter (VSC) for HVDC Transmission System Based on VSC", Power and Energy Society General Meeting—Conversion and Delivery of Electrical Energy in the 21st Century, 2008 IEEE, IEEE, Piscataway, NJ, USA, Jul. 20, 2008, p. 1-8.
Hongbo, Jiang, et al., "Harmonic Cancellation of a Hybrid Converter", High Power Electronics, The Royal Institute of Technology, Stockholm Sweden, IEEE Transactions on Power Delivery, vol. 13, No. 4, Oct. 1998, pp. 1291-1296.
Liu, Y.H. et al., "A New STATCOM Configuration Using Multi-Level DC Voltage Reinjection for High Power Application", IEEE Transactions on Power Delivery, vol. 19, No. 4, Oct. 2004, New Zealand, pp. 1828-1834.
Liu, Y.H. et al., "A New High-Pulse Voltage-Sourced Converter for HVdc Transmission", IEEE Transactions on Power Delivery, vol. 18, No. 4, Oct. 2003, New Zealand, pp. 1388-1393.
Qahraman, B. et al., "A VSC Based Series Hybrid Converter for HVDC Transmission", IIEE 0-7803-8886-0/05 CCECE/CCGEI, Saskatoon, May 2005, pp. 458-461.
PCT International Search Report and Written Opinion in International Application No. PCT/EP2011/059514, mailed on Jul. 5, 2012.
International Search Report for Application No. PCT/EP2010/061145, mailed on Jun. 5, 2011.
Office Action in U.S. Appl. No. 13/388,277, mailed on Jul. 3, 2014.
Office Action in U.S. Appl. No. 13/639,844, mailed on May 22, 2014.
Notice of Allowance in U.S. Appl. No. 13/640,468, mailed on Jun. 4, 2014.
Notice of Allowance in U.S. Appl. No. 13/818,654, mailed on May 30, 2014.
First Chinese Office Action in Application No. 200980160700.4, mailed Jun. 25, 2014.
Notice of Allowance in U.S. Appl. No. 13/378,336, mailed on Jun. 13, 2014.

\* cited by examiner

HVDC CONVERTER INCLUDING FULLBRIDGE CELLS FOR HANDLING A DC SIDE SHORT CIRCUIT

CROSS REFERENCE TO RELATED APPLICATIONS OR PRIORITY CLAIM

This application is a national stage application under 35 U.S.C. 371 from PCT Application No. PCT/EP2010/061145, filed Jul. 30, 2010, entitled, "HVDC CONVERTER COMPRISING FULLBRIDGE CELLS FOR HANDLING A DC SIDE SHORT CIRCUIT", the contents of which are incorporated herein by reference in its entirety.

This invention relates to a power electronic converter for use in high voltage direct current (HVDC) power transmission and reactive power compensation.

In power transmission networks alternating current (AC) power is typically converted to direct current (DC) power for transmission via overhead lines and/or undersea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC to DC power is also utilized in power transmission networks where it is necessary to interconnect AC networks operating at different frequencies.

In any such power transmission network, converters are required at each interface between AC and DC power to effect the required conversion, and one such form of converter is a voltage source converter (VSC).

An example of a voltage source converter is the use of six-switch (two-level) and three-level multilevel converter topologies with insulated gate bipolar transistors (IGBT) 20 interconnecting a DC network 22 and an AC network 24, as shown in FIG. 1. The IGBT devices 20 are connected and switched together in series to enable high power ratings of 10's to 100's of MW to be realized.

This conventional approach requires a complex and active IGBT drive, and may require large passive snubber components to ensure that the high voltage across the series strings of IGBT devices 20 shares properly during converter switching. In addition, the IGBT devices 20 need to switch on and off several times at high voltage over each cycle of the AC supply frequency to control the harmonic currents being fed to the AC network 24.

Another example of a voltage source converter lies in a multilevel converter arrangement interconnecting a DC network 22 and an AC network 24, which is shown in FIG. 2. In the conventional multilevel converter, converter bridges or cells 26 are connected in series, each cell 26 being switched at a different time. Each cell 26 includes a pair of semiconductor switches 28 connected in parallel with a capacitor 30 in a half bridge arrangement to define a 2-quadrant unipolar module that can develop zero or positive voltage and can conduct current in both directions. The conventional multilevel converter arrangement eliminates the problems associated with the direct switching of series connected IGBT devices, because the individual bridge cells 26 do not switch simultaneously and converter voltage steps are comparatively small.

During operation of HVDC power transmission networks, voltage source converters may however be vulnerable to DC side faults that present a short circuit with low impedance across the DC power transmission lines or cables. Such faults can occur due to damage or breakdown of insulation, movement of conductors or other accidental bridging between conductors by a foreign object.

The presence of low impedance across the DC power transmission lines or cables is detrimental to a voltage source converter because it can cause current flowing in the voltage source converter to increase to a fault current level many times above its original value. In circumstances where the voltage source converter was only designed to tolerate levels of current below the level of the fault current, such a high fault current damages components of the voltage source converter.

Conventionally, in order to reduce the risk posed by a short circuit to a device, one or more switches would be opened to switch the device out of circuit. However the switching elements of voltage source converters, such as the voltage source converter shown in FIG. 3, typically include anti-parallel diodes 32 that remain in conduction when the insulated gate bipolar transistors 20 are opened. Consequently, even when the insulated gate bipolar transistors 20 are opened, the diodes 32 allow the fault current 34 arising from a short circuit 36 in a DC network 38 connected to the voltage source converter to flow continuously through the converter, as shown in FIG. 3.

Another option for reducing the risk posed to a voltage source converter by a short circuit is to design the voltage source converter to tolerate the resultant fault current so that there is sufficient time to detect the fault and extinguish the current by opening a circuit breaker on the other, AC side of the voltage source converter.

However the fault current arising from a short circuit in a DC network connected to the voltage source converter is typically many times greater than the rated value of the converter. In order to increase the tolerance of the voltage source converter, either the size and capacity of conducting converter diodes must be increased, several converter diodes must be connected in parallel or a fast-acting bypass device must be incorporated that is capable of carrying the high fault current. In any case, whichever option is pursued, additional inductive components are almost certainly required to limit the high fault current and the increase in components leads to an increase in converter size and weight. This in turn leads to an increase in the size and area of the associated HVDC converter station.

In addition, opening a circuit breaker on the opposite, non-faulty side of the voltage source converter is disadvantageous because it disconnects the other network from the HVDC power transmission network. Consequently after the fault is repaired, the converter station must go through a start-up sequence and a series of checks before the other network can be reconnected to the HVDC power transmission network. This leads to a prolonged interruption of power flow and therefore non-availability of the power transmission scheme to those dependent on the scheme for electrical power supply.

A further option is to open a circuit breaker on the DC side of the voltage source converter to allow the fault in the DC network to be isolated and repaired. However, the non-zero direct current flowing in the voltage source converter results in the formation of a sustained power arc when conventional mechanical circuit breaking contacts are used. It is therefore necessary to use expensive, specialised DC circuit breaking equipment to interrupt the DC side fault current, which leads to an increase in converter size, weight and cost.

According to an aspect of the invention, there is provided a power electronic converter for use in high voltage direct current power transmission and reactive power compensation comprising three converter limbs, each converter limb including first and second DC terminals for connection in use to a DC network and an AC terminal for connection in use to a respective phase of a three-phase AC network, each converter limb defining first and second limb portions being connected in series between the respective AC terminal and a respective one of the first and second DC terminals, each limb portion including at least one switching element being controllable in use to facilitate power conversion between the AC and DC networks, the power electronic converter further including a plurality of auxiliary units, each auxiliary unit being operably associated with the respective phase of the AC network, each auxiliary unit including at least one module including a voltage source, the limb portions being controllable in use to define at least one three-phase static synchronous compensator including at least one of the plurality of auxiliary units in each branch of a star configuration, each of the first and/or second DC terminals defining the neutral point of the respective star configuration.

The provision of the plurality of auxiliary units and limb portions in the power electronic converter allows the power electronic converter to continue exchanging reactive power with the AC network in a controlled manner in the event of a fault in the DC network. The operation of the or each three-phase static synchronous compensator formed from multiple auxiliary units is independent of the DC network, which allows the fault in the DC network to be isolated and repaired without affecting the power electronic converter. Once the fault has been repaired, the auxiliary units may be controlled to resume power conversion between the AC and DC networks.

As outlined earlier, the presence of a fault, such as a short circuit, in the DC network may result in high fault current in the power electronic converter. The formation of the or each three-phase static synchronous compensator however provides control over the current flowing within the power electronic converter and thereby minimises the risk of damage to the power electronic converter components. Additionally the or each three-phase static synchronous compensator may be operated to minimise the flow of current into the DC network from the respective neutral point exchanging reactive power with the AC network. This reduces the risk of damage to the DC network components but also prevents the flow of power into any power arc created by the fault in the DC network.

Omitting the plurality of auxiliary units would render it necessary to disconnect the power electronic converter from the AC network, which not only results in a prolonged offline period of the power electronic converter for reasons outlined earlier, but also leads to sudden voltage disturbances that may adversely affect the power electronic converter.

The limb portions may be operated as follows to form various configurations of the power electronic converter so as to define the or each static synchronous compensator, depending on the characteristics of the AC network.

In embodiments of the invention, the limb portions may be controllable in use to simultaneously define first and second three-phase static synchronous compensators having a star configuration, the first and second DC terminals defining the neutral point of the respective star configuration. In such embodiments, each auxiliary unit of the first and second three-phase static synchronous compensators may be controllable in use to synchronise the operation of the first and second static synchronous compensators The formation of both first and second three-phase static synchronous compensators is advantageous in that it enables up to twice the rated reactive current to be drawn from the AC network, which may be used to reduce large voltage transients present in the AC network. Synchronising the operation of the first and second three-phase static synchronous compensators allows the voltages at their respective neutral points to be approximately equal, which minimises the voltage appearing across the DC network.

In other embodiments, the limb portions may be controllable in use to alternately define the first and second three-phase static synchronous compensators. In such embodiments, the limb portions may be controllable in use to alternately define the first and second three-phase static synchronous compensators in a 50:50 duty cycle.

In further embodiments, each auxiliary unit of the or each three-phase static synchronous compensator is controllable in use to generate a voltage waveform in the respective branch of the star configuration, the voltage waveform having a phase angle displacement of 120 electrical degrees with respect to the other voltage waveforms generated by the other auxiliary units of the respective three-phase static synchronous compensator. Preferably each generated voltage waveform is a near approximation of a sinusoid waveform.

The voltage at the neutral point of the or each three-phase static synchronous compensator is equal to the average of the voltages produced in each branch of the respective star configuration. As such, the neutral point voltage will be nominally zero when the generated voltage waveforms are near perfect sinusoids of equal magnitude and 120 electrical degrees apart, which minimises the amount of current flowing into the DC network.

Preferably each module includes: a voltage source in the form of at least one energy storage device; and at least one primary switching element to switch the or each energy storage device in and out of circuit.

In such embodiments, each module may include two pairs of primary switching elements connected in parallel with an energy storage device to define a 4-quadrant bipolar module that provides negative, zero or positive voltage and can conduct current in two directions.

The ability of a 4-quadrant bipolar module to provide zero, positive or negative voltages is compatible with the generation of an AC voltage waveform in each branch of the star configuration of the respective three-phase static synchronous compensator.

In embodiments of the invention, each auxiliary unit may include a plurality of modules connected in series to define a chain-link converter.

The structure of the chain-link converter allows the build-up of a combined voltage, which is higher than the voltage provided by an individual module, via the insertion of multiple modules, each providing a voltage, into the chain-link converter. By varying the value of the combined voltage, the chain-link converter may be operated to generate a voltage waveform of variable amplitude and phase angle.

In such embodiments employing the use of at least one module including at least one energy storage device and at least one primary switching element, the or each primary switching element of each module of each chain-link converter may be controllable in use to switch the respective energy storage device in and out of circuit so that the chain-link converter provides a stepped variable voltage source.

This multilevel arrangement allows the synthesis of voltage waveforms having different shapes by adjusting the timing of switching operations for each module in the chain-link converter. By varying the value of the combined voltage, the chain-link converter may be operated to generate a voltage waveform of variable amplitude and phase angle.

When the chain-link converter includes one or more 4-quadrant bipolar modules, the ability of the 4-quadrant bipolar module to provide positive or negative voltages means that the voltage across the or each chain-link converter may be built up from a combination of modules providing positive or negative voltages. The energy levels in the individual energy storage devices may be maintained therefore at optimal levels by controlling the modules to alternate between positive or negative voltage.

In other embodiments, each limb portion may include at least one secondary switching element connected in series between the respective AC terminal and the DC terminal connected to the respective limb portion.

The or each secondary switching element in each limb portion may be operated to carry out rectification and inversion processes in order to transfer electrical power between the AC and DC networks.

In further embodiments, one of the plurality of auxiliary units may be connected to the AC terminal of the respective converter limb for connection in use between the respective converter limb and the AC network.

This arrangement minimises the number of auxiliary units required to define the or each three-phase static synchronous compensator with the first and/or second DC terminals as the neutral point of the respective star configuration.

Each limb portion may include one of the plurality of auxiliary units.

The integration of the auxiliary units into the limb portions allows the limb portions to carry out both power conversion and the formation of the or each static synchronous compensator. This leads to savings in terms of hardware size, weight and costs.

Each limb portion may include at least one secondary switching element connected in series with the respective auxiliary unit of the limb portion.

The series combination of one or more secondary switching elements connected in series with a auxiliary unit in each portion is advantageous because it reduces the number of components in the auxiliary unit required to carry out voltage conversion between the AC and DC networks.

In embodiments employing the use of a auxiliary unit in each limb portion, the auxiliary unit of each limb portion may be controllable in use to provide a voltage so as to minimise the voltage across the or each secondary switching element of the respective limb portion.

In each limb portion not forming part of the three-phase static synchronous compensator, when the limb portion also includes at least one secondary switching element connected in series with the auxiliary unit, the operation of the auxiliary unit of each limb portion in this manner can also be used to not only minimise the voltage stress across the or each open secondary switching element but also maintain the corresponding anti-parallel diode in an reversed biased and non-conducting state. when the limb portion does not form part of the three-phase static synchronous compensator.

In embodiments of the invention, the or each switching element of each limb portion may be controllable in use to switch the respective limb portion into or out of circuit so as to define the or each three-phase static synchronous compensator.

In other embodiments, the or each secondary switching element of each limb portion may be controllable in use to turn on or turn off so as to define the or each three-phase static synchronous compensator.

The operation of the switching elements in this manner results in the formation of the or each static synchronous compensator having a star configuration, where the first and/or second DC terminals defines the neutral point of the respective star configuration.

Preferably each switching element includes at least one semiconductor device. Such a semiconductor device may be an insulated gate bipolar transistor, a field effect transistor, a gate turn-off thyristor, a gate commutated thyristor, an insulated gate commutated thyristor or an integrated gate commutated thyristor, preferably connected in parallel with an anti-parallel diode.

The use of semiconductor devices is advantageous because such devices are small in size and weight and have relatively low power dissipation, which minimises the need for cooling equipment. It therefore leads to significant reductions in power converter cost, size and weight.

The fast switching capabilities of such semiconductor devices allow the power electronic converter to synthesize complex waveforms for injection into the AC side and/or DC side of the power electronic converter. The injection of such complex waveforms can be used, for example, to minimise the levels of harmonic distortion typically associated with line-commutated thyristor-based power electronic converters. Furthermore the inclusion of such semiconductor devices allow the auxiliary units to respond quickly to the development of DC side faults, and thereby improve fault protection of the power electronic converter.

In embodiments employing the use of at least one module including at least one energy storage device, each energy storage device includes a capacitor, a fuel cell, a battery, a photovoltaic cell or an auxiliary AC generator with an associated rectifier.

The energy storage device may be any device that is capable of storing and releasing its electrical energy to provide a voltage. This flexibility is useful in designing converter stations in different locations where the availability of equipment may vary due to locality or transport difficulties. For example, on offshore wind farms, the energy storage device may be an auxiliary AC generator connected to a wind turbine.

In other embodiments employing the use of at least one energy storage device, each energy storage device may be controllable in use to adjust its voltage output.

This allows the power electronic converter to generate AC voltage waveforms of different magnitude so as to modify the reactive power provided to the AC network. For example, the voltage output of each energy storage device may be increased to allow the converter to generate a voltage waveform of higher magnitude than the AC network so as to provide leading reactive power. This removes the need to include additional modules of the auxiliary unit, which are only required to increase the magnitude of the voltage waveform but remain unused during power conversion between the AC and DC networks. This therefore leads to reductions in hardware size, weight and costs.

In further embodiments employing the use of at least one energy storage device, the or each switching element of each module may be controllable in use to regulate the voltage of the respective energy storage devices.

The regulation of voltage levels provides additional control over the voltage levels of the energy storage devices of each module. This form of control may be used, for example, to balance the voltage levels of individual modules. This is advantageous because it means that the voltage of any particular module can be kept approximately equal to an average module voltage to simplify the control and improve the performance of a voltage source converter which uses the average module voltage as feedback to control switching of the modules of the auxiliary units.

In embodiments of the invention, the or each three-phase static synchronous compensator may be controllable in use to exchange reactive power with the AC network. In such embodiments the or each three-phase static synchronous compensator may be controllable in use to provide lagging or leading reactive power to the AC network.

The exchange of reactive power between the power electronic converter and the AC network allows the stabilisation of any voltage disturbances arising either from the sudden interruption of real power flow between the AC and DC networks or from changes occurring in other connected loads or power sources as a result of the initiation and/or removal of the fault in the DC network.

In other embodiments the or each three-phase static synchronous compensator may be controllable in use to provide power to the DC network in the event of a fault, in use, in the DC network.

Providing power to a fault site in the DC network not only allows an operator to determine the location of the fault in the DC network but also to allow protective equipment associated with the DC network to function properly.

In further embodiments, the power electronic converter may further include a three-phase transformer including a plurality of windings in a star configuration operably connected to each AC terminal for connection in use between the respective converter limb and the AC network.

The provision of a plurality of windings in a star configuration allows either the first or second DC terminals to be grounded by virtue of being connected to the neutral point of the star configuration of the plurality of windings. The limb portions directly connected to the grounded DC terminal may therefore be controlled to define the voltage of the static synchronous compensator.

Preferred embodiments of the invention will now be described, by way of non-limiting examples, with reference to the accompanying drawings in which.

Figure 1:
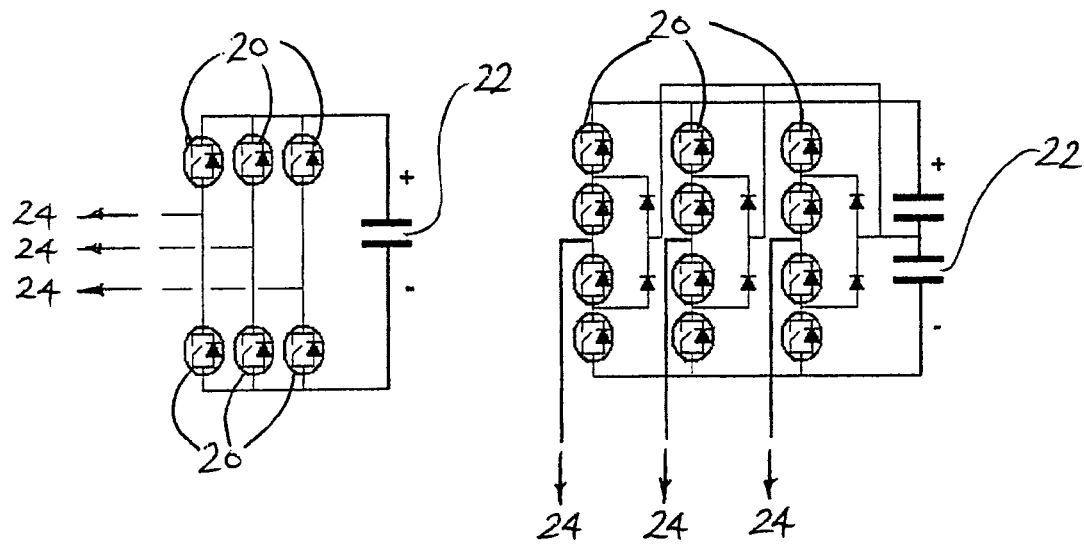
FIGS. 1 and 2 shows, in schematic form, prior art voltage source converters.
Figure 2:
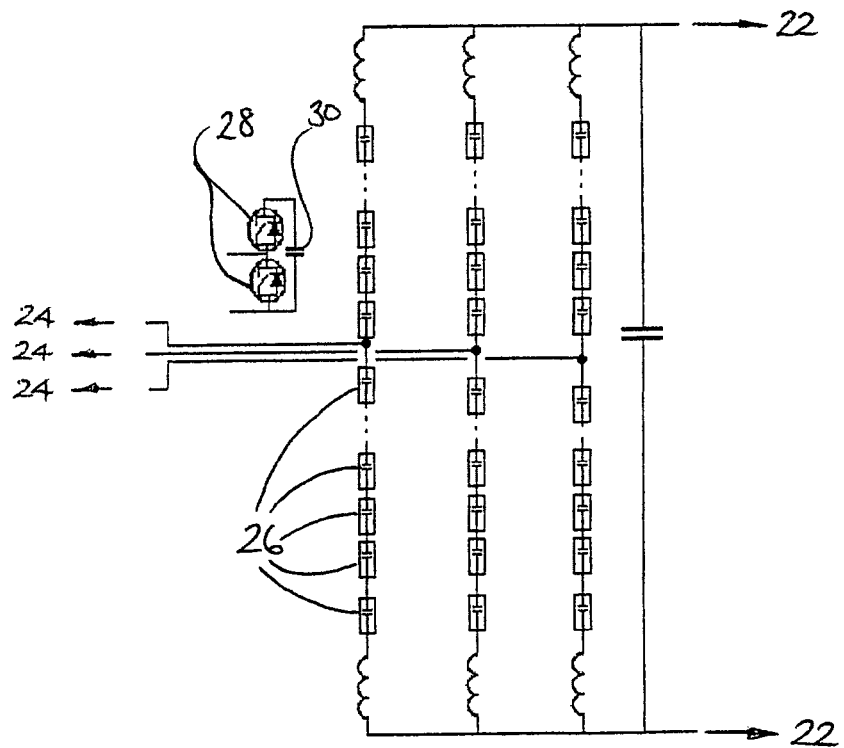
Figure 3:
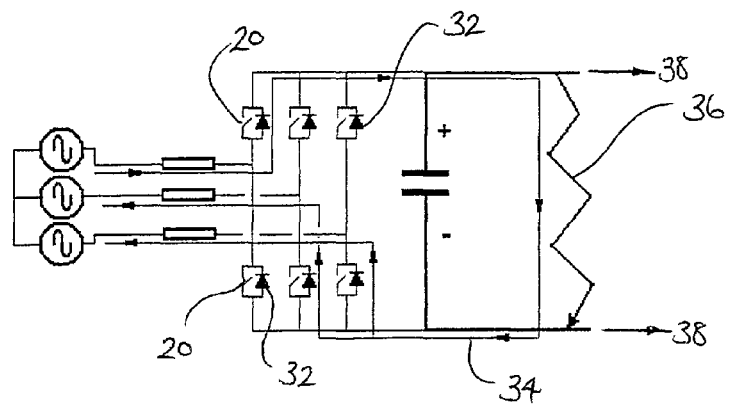
FIG. 3 shows the formation of fault current in a three-phase voltage source converter following the occurrence of a fault in the connected DC network.
Figure 4:
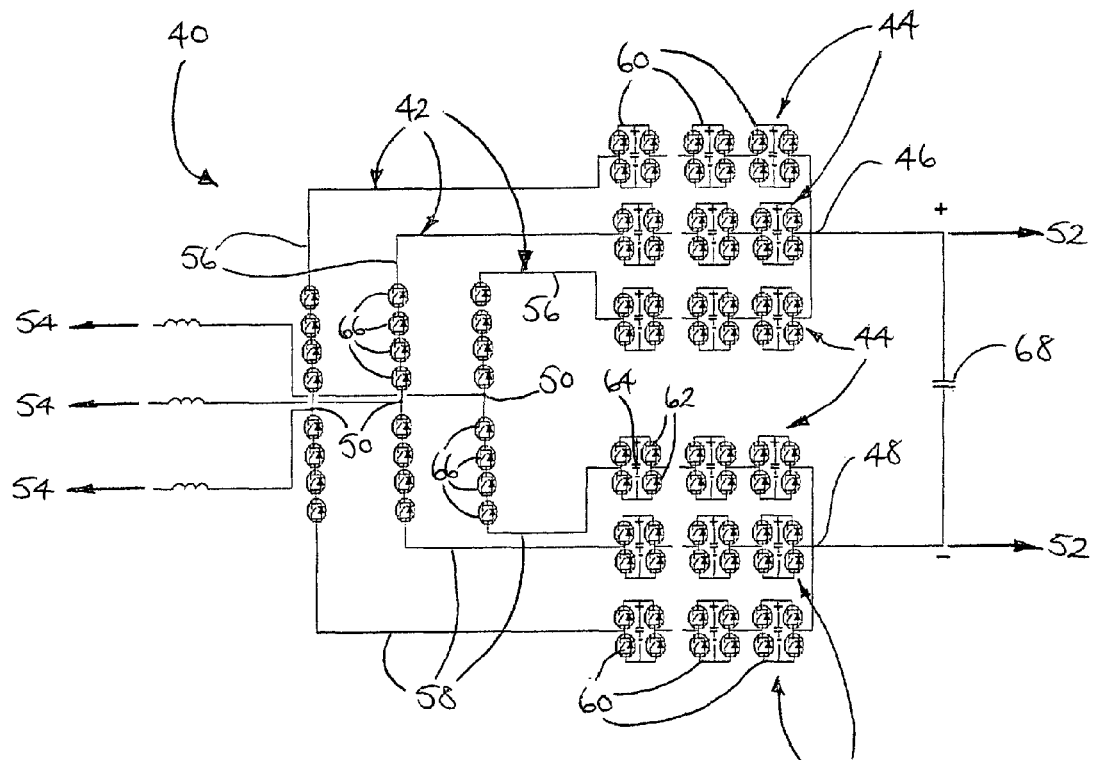
FIG. 4 shows a power electronic converter according to a first embodiment of the invention.

A power electronic converter 40 according to a first embodiment of the invention is shown in FIG. 4.

The power electronic converter 40 comprises three converter limbs 42 and a plurality of auxiliary units 44.

Each converter limb 42 includes first and second DC terminals 46,48 and an AC terminal 50.

In use, in each converter limb, the first and second DC terminals 46,48 are respectively connected to positive and negative terminals of a DC network 52, the positive and negative terminals respectively carrying voltages of +Vdc/2 and −Vdc/2, while the AC terminal 50 is connected to a respective phase of a three-phase AC network 54.

Each converter limb 42 defines first and second limb portions 56,58. In each converter limb 42, the first limb portion 56 is connected in series between the first DC terminal 46 and the AC terminal 50 while the second limb portion 58 is connected in series between the second DC terminal 48 and the AC terminal 50.

Each of the first and second limb portions 56,58 of each converter limb 42 includes an auxiliary unit 44. The auxiliary unit 44 of each limb portion 56,58 includes a plurality of modules 60 connected in series to define a chain-link converter 44. The number of modules 60 in each chain-link converter 44 is determined by the required voltage rating of the respective limb portion 56,58. Each module 60 includes two pairs of primary switching elements 62 connected in parallel with a capacitor 64 to define a 4-quadrant bipolar module 60 that provides negative, zero or positive voltage and can conduct current in two directions.

Each limb portion 56,58 further includes a plurality of series-connected secondary switching elements 66 connected in series with the auxiliary unit 44 of the limb portion 56,58. It is envisaged that in other embodiments the number of series-connected secondary switching elements 66 in each limb portion 56,58 may vary.

The series connection between the plurality of series-connected secondary switching elements 66 and the auxiliary unit 44 of each of the first and second limb portions 56,58 means that, in other embodiments, they may be connected in a reverse order between the AC terminal 50 and the respective DC terminal 46,48.

The power electronic converter 40 further includes a DC link capacitor 68 connected in series between the first and second DC terminals 46,48 and connected in parallel with each of the converter limbs 42.

The primary switching elements 62 of the modules 60 of each chain-link converter 44 are operable in use so that each chain-link converter 44 provides a stepped variable voltage source, and are switched at near to the fundamental frequency of the AC network.

The capacitor 64 of each module 60 may be bypassed or inserted into the respective chain-link converter 44 by changing the state of the primary switching elements 62.

The capacitor 64 of each module 60 is bypassed when the pairs of primary switching elements 62 are configured to form a short circuit in the module 60, causing the current in the power electronic converter 40 to pass through the short circuit and bypass the capacitor 64. This enables the module 60 to provide a zero voltage.

The capacitor 64 of each module 60 is inserted into the respective chain-link converter 44 when the pair of secondary switching elements 66 is configured to allow the converter current to flow into and out of the capacitor 64, which is then able to charge or to discharge its stored energy and provide a voltage. The bidirectional nature of the 4-quadrant bipolar module 60 means that the capacitor 64 may be inserted into the module 60 in either forward or reverse directions so as to provide a positive or negative voltage.

It is therefore possible to build up a combined voltage across the chain-link converter 44 which is higher than the voltage available from each individual module 60 via the insertion of the capacitors of multiple modules 60, each providing its own voltage, into the chain-link converter 44.

The ability of a 4-quadrant bipolar module 60 to provide positive or negative voltages means that the voltage across each chain-link converter 44 may be built up from a combination of modules 60 providing positive or negative voltages. The energy levels in individual capacitors 64 may be maintained therefore at optimal levels by controlling the modules 60 to alternate between providing positive or negative voltage.

Figure 5:
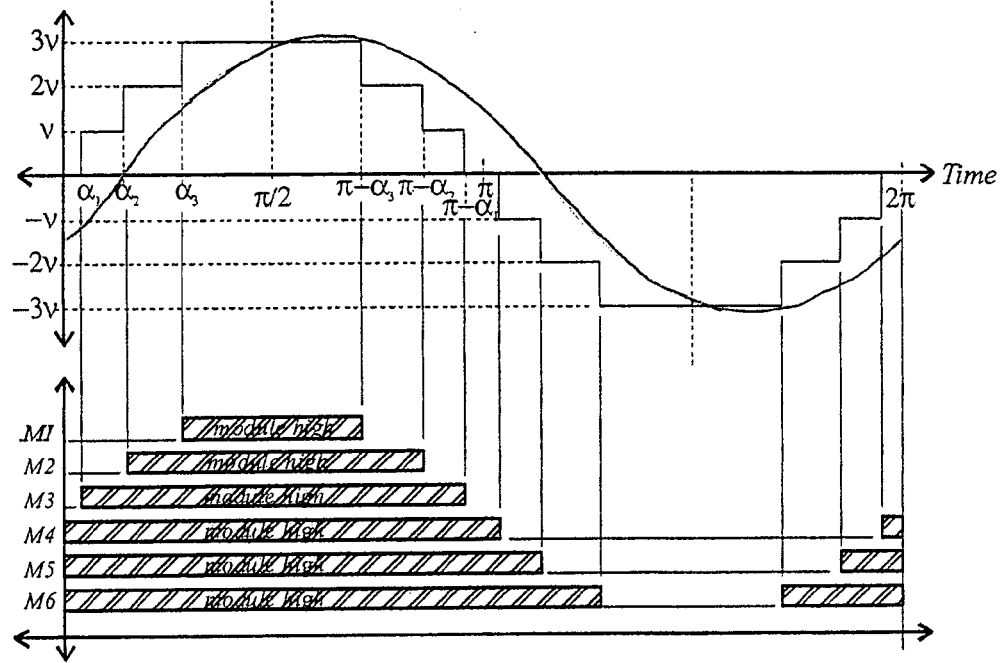
FIG. 5 shows the synthesis of a 50 Hz voltage waveform using a chain-link converter.

It is also possible to vary the timing of switching operations for each module such that the insertion and/or bypass of the capacitors of individual modules in the chain-link converter results in the generation of a voltage waveform. An example of a voltage waveform generated using the chain-link converter is shown in FIG. 5, in which the insertion of the capacitors of the individual modules is staggered to generate a 50 Hz sinusoidal waveform. Other waveform shapes may be generated by adjusting the timing of switching operations for each module in the chain-link converter.

In the embodiment shown in FIG. 4, each switching element 62,66 includes an insulated gate bipolar transistor connected in parallel with an anti-parallel diode.

It is envisaged that in other embodiments each switching element 62,66 may include a different semiconductor device, such as a field effect transistor, a gate-turn-off thyristor, an insulated gate commutated thyristor, an integrated gate-commutated transistor or other forced commutated or self commutated semiconductor switches, preferably connected in parallel with an anti-parallel diode.

The fast switching capabilities of such semiconductor devices allow the power electronic converter 40 to synthesize complex waveforms for injection into the AC side and/or DC side of the power electronic converter 40. The injection of such complex waveforms can be used, for example, to minimise the levels of harmonic distortion typically associated with line-commutated thyristor-based voltage source converters. Furthermore the inclusion of such semiconductor devices allows the auxiliary units 44 to respond quickly to the development of DC side faults, and thereby improve fault protection of the power electronic converter 40.

It is also envisaged that in other embodiments, the capacitor 64 of each module 60 may be replaced by a different energy storage device such as a fuel cell, a battery, a photovoltaic cell or an auxiliary AC generator with an associated rectifier.

In use the secondary switching elements 66 and the chain-link converters 44 of the first and second limb portions 56,58 are operable to switch each of the chain-link converters 44 in and out of circuit between the respective DC terminal 46,48 and the AC terminal 50. The chain-link converters 44 are operable to generate a voltage waveform at the respective AC terminal 50 to facilitate power conversion between the AC and DC networks 52,54.

The chain-link converters 44 are preferably operable to generate a sinusoidal voltage waveform using a step-wise approximation. The chain-link converters 44 are suitable for use in step-wise waveform generation due to their ability to provide voltage steps to increase or decrease the output voltage at the respective AC terminal 50.

The operation of the power electronic converter of FIG. 4 is described with reference to FIG. 6.

Figure 6:
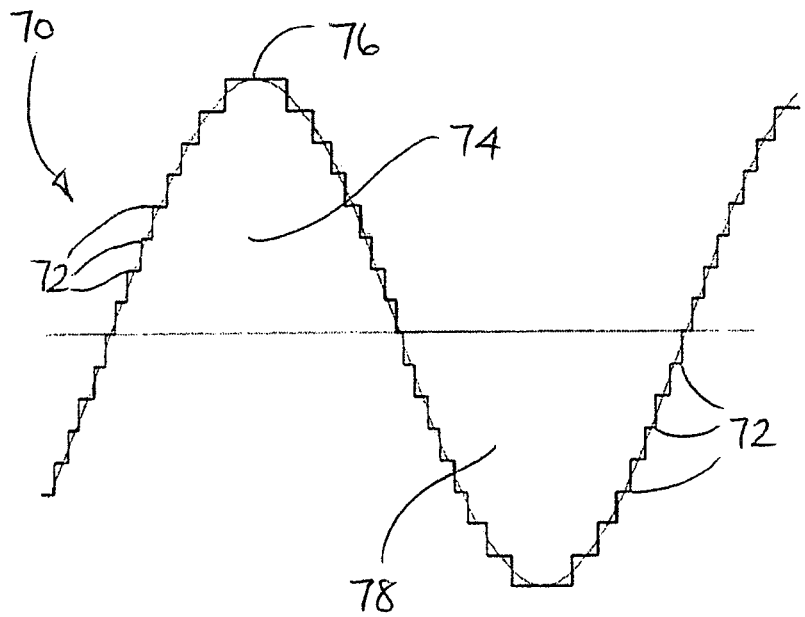
FIG. 6 shows a step-wise approximation of a sinusoidal voltage waveform.

As previously described, the switching operations in the modules 60 may be configured so that the insertion and bypass of the capacitors 64 are staggered to form a step-wise approximation of a sinusoidal waveform 70, as shown in FIG. 6. The step-wise approximation of the voltage waveform 70 may be improved by using a higher number of modules 60 with lower voltage levels to increase the number of voltage steps 72.

As shown in FIGS. 7 to 12, In the event of a fault 79 occurring in the DC network 52, the series-connected secondary switching elements 66 and the auxiliary units 44 of the limb portions 56,58 may be operated to form various configurations of the power electronic converter 40 so as to define at least one static synchronous compensator including one of the plurality of auxiliary units 44 in each branch of a star configuration, the first and/or second DC terminals 46,48 defining the neutral point of the respective star configuration.

Figure 7:
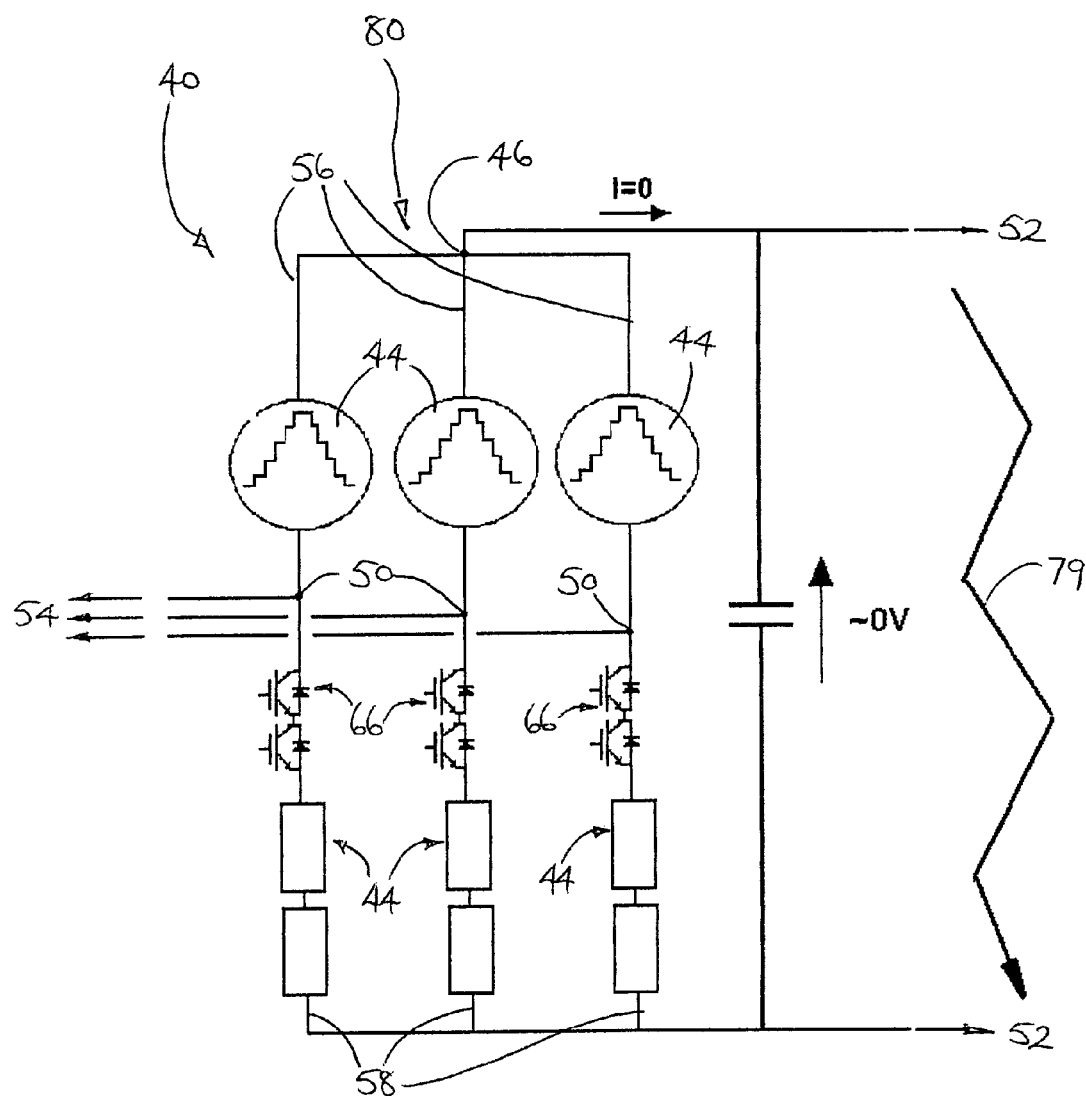
FIGS. 7 to 10 shows the formation of first and/or second three-phase static synchronous compensator in the power electronic converter of FIG. 4.

In FIG. 7, the secondary switching elements 66 of the first and second limb portions 56,58 are respectively turned on and off. This results in the formation of a first three-phase static synchronous compensator 80 having a star configuration, in which each auxiliary unit 44 of each first limb portion 56 is located in the respective branch of the star configuration and the first DC terminal 46 defines a neutral point of the star configuration.

When the first three-phase static synchronous compensator 80 is formed, each auxiliary unit 44 of each first limb portion 56 is controlled to generate a near approximation of a sinusoidal voltage waveform having a phase angle displacement of 120 electrical degrees with respect to the other voltage waveforms generated by the auxiliary units 44 of the other first limb portions 56. This results in a near zero voltage at the neutral point 46 of the star configuration of the first three-phase static synchronous compensator 80 since the neutral point voltage is equal to the average of the voltages produced in each branch of the star configuration.

Consequently current only flows within the first limb portions 56 and between the AC terminals 50 and the AC network 54. Since the current flowing into the DC network 52 is zero or minimal, there is a reduced risk of damage to the DC network components but also prevents the flow of power into any power arc created by the fault 79 in the DC network 52.

The operation of the first three-phase static synchronous compensator 80 in this manner allows the power electronic converter 40 to continue the exchange of reactive power with the AC network 54 in the event of a fault 79 occurring in the DC network 52. In use, the auxiliary units 44 of the first three-phase static synchronous compensator 80 may be controlled to provide lagging or leading reactive power to the AC network 54. This exchange of reactive power between the power electronic converter 40 and the AC network 54 allows the stabilisation of any voltage disturbances arising either from the sudden interruption of real power flow between the AC and DC networks 54,52 or from changes occurring in other connected loads or power sources as a result of the initiation and/or removal of the fault 79 in the DC network 52.

The operation of the first three-phase static synchronous compensator 80 formed from multiple auxiliary units 44 is independent of the DC network 52, which allows the fault 79 in the DC network 52 to be isolated and repaired without affecting the power electronic converter 40. Once the fault 79 has been repaired, the limb portions 56,58 may be controlled to resume power conversion between the AC and DC networks 54,52.

In FIG. 7, the second limb portions 58 are switched out of circuit and thereby do not form part of the first three-phase static synchronous compensator 80. The auxiliary unit 44 of each second limb portion 58 may be controlled to provide a voltage so as to not only minimise the voltage stress across the open secondary switching elements 66 of the respective second limb portion 44, but also maintain the corresponding anti-parallel diode in an reversed biased and non-conducting state.

Figure 8:
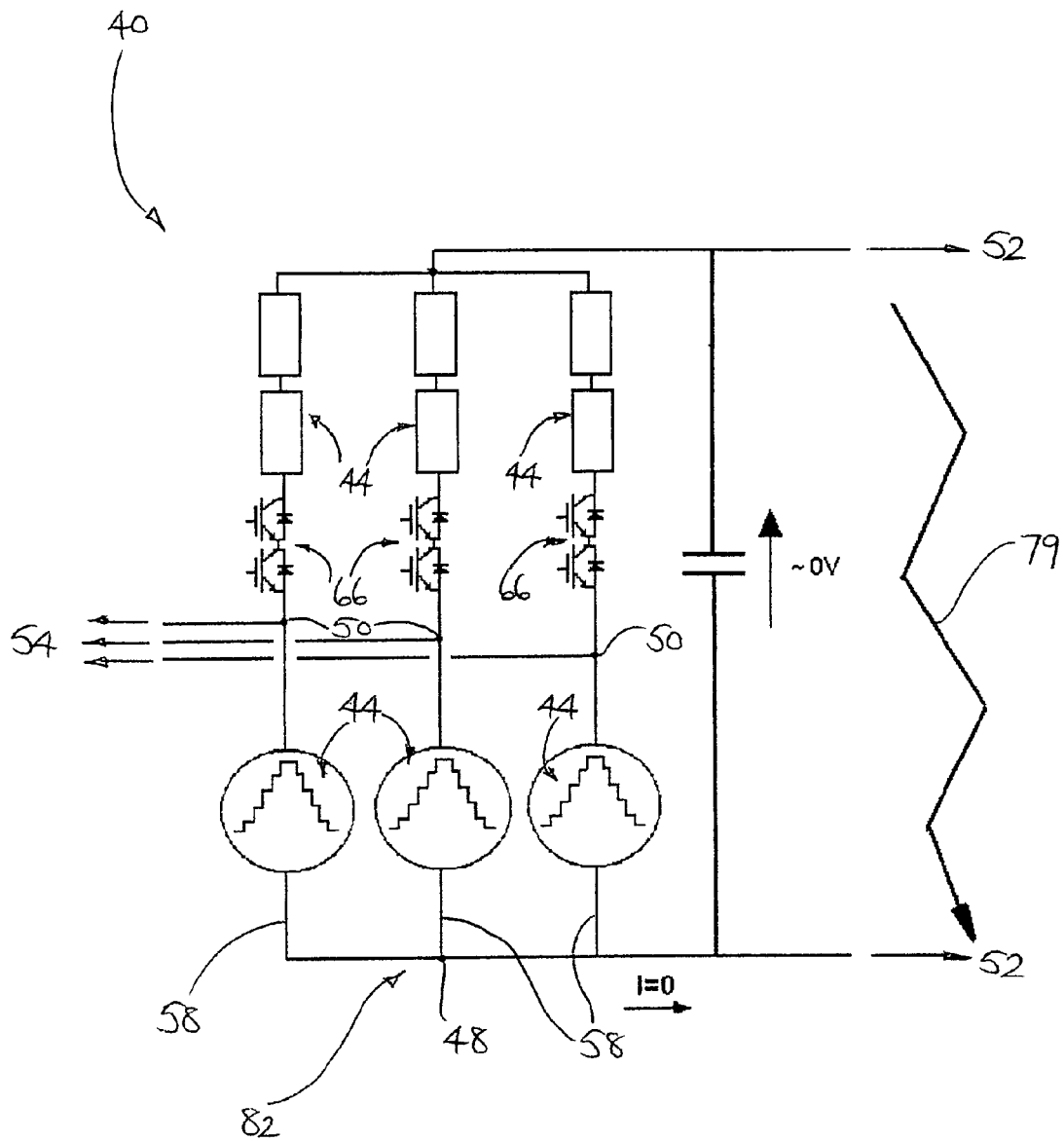

In FIG. 8, the secondary switching elements 66 of the first and second limb portions 56,58 are respectively turned off and on. This results in the formation of a second three-phase static synchronous compensator 82 having a star configuration, in which each auxiliary unit 44 of each second limb portion 58 is located in the respective branch of the star configuration and the second DC terminal 48 defines a neutral point of the star configuration.

The operation of the first three-phase synchronous compensator 80 applies mutatis mutandis to the operation of the second three-phase synchronous compensator 82.

Figure 9:
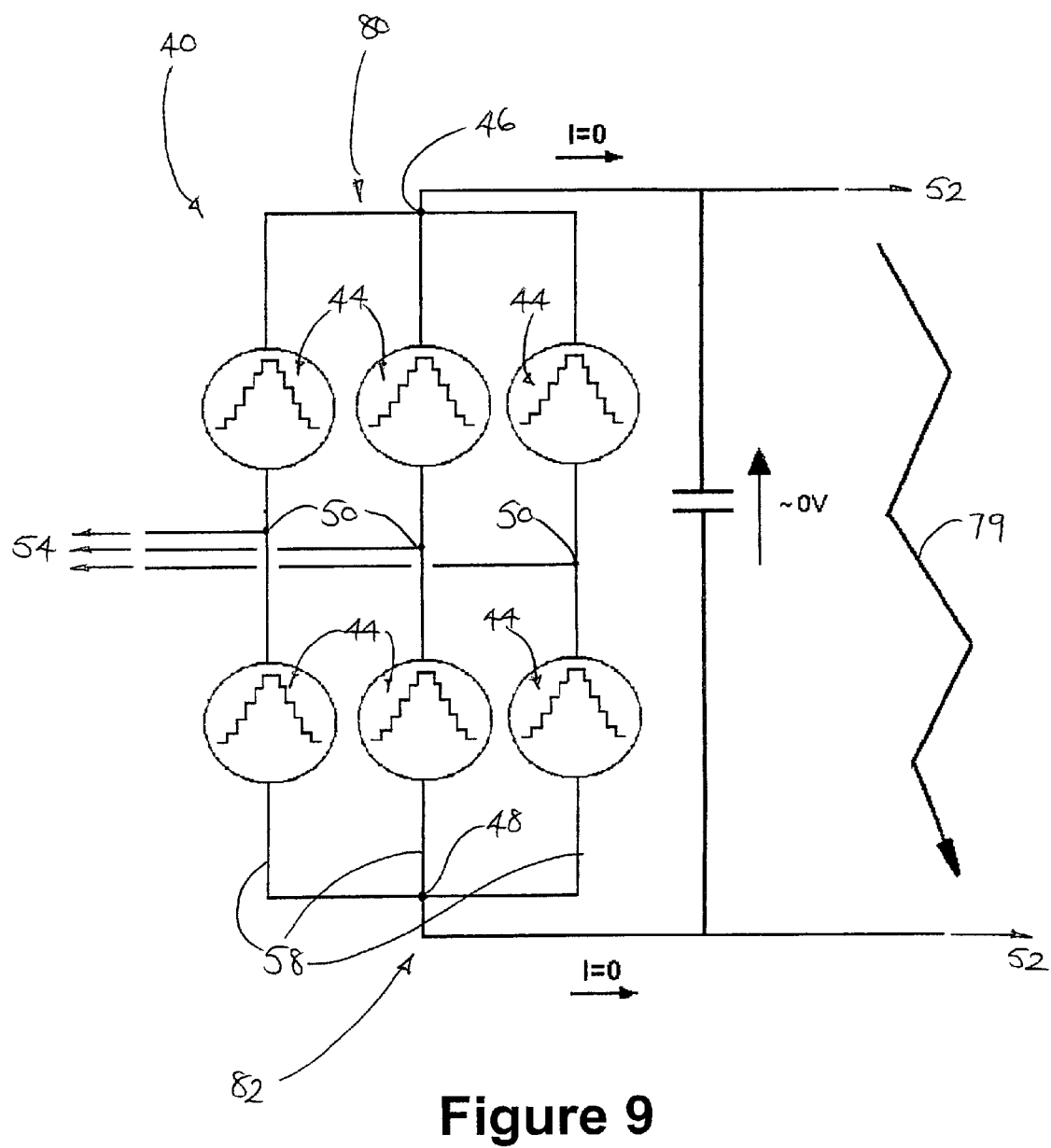

In FIG. 9, the secondary switching elements 66 of the first and second limb portions 56,58 are turned on. This results in the formation of both the first and second three-phase static synchronous compensator 80,82. The operation of the simultaneously formed first and second three-phase static synchronous compensators 80,82 is similar to the above-described operation of each of the separately formed first and second three-phase static synchronous compensators 80,82.

The formation of both first and second three-phase static synchronous compensators 80,82 is advantageous in that it enables up to twice the rated reactive current to be drawn from the AC network 54, which may be used to reduce large voltage transients present in the AC network 54.

Figure 10:
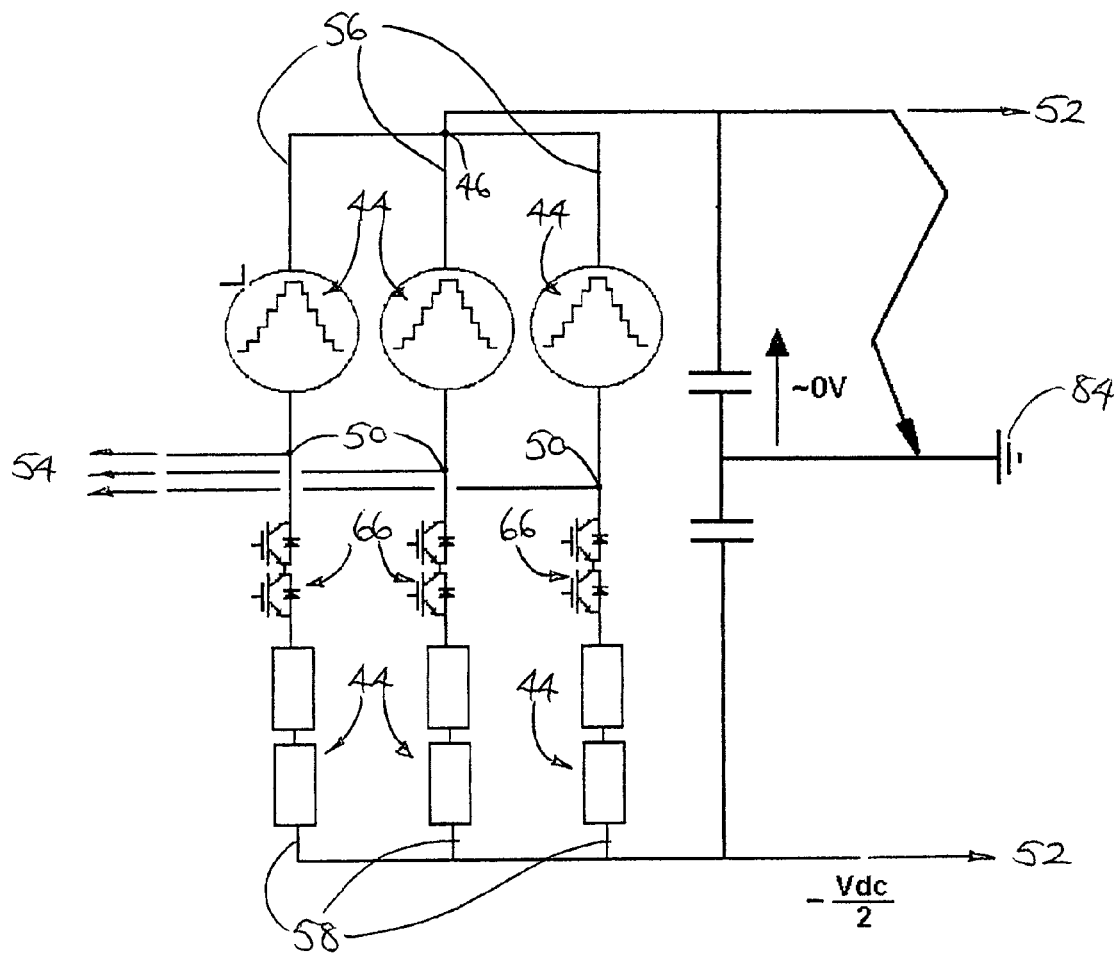

The fault 79 in the DC network 52 may take the form of a grounding of the first DC terminal 46 to a ground terminal 84 of the DC network 52, as shown in FIG. 10. The second DC terminal 48 is ungrounded and thereby continues to carry its operating voltage.

The auxiliary units of the first limb portions 56 may be operated to form the first three-phase static synchronous compensator 80 having a star configuration, where the grounded DC terminal 46 defines the neutral point of the star configuration, while the second limb portions 58 directly connected to the ungrounded DC terminal 48 are switched out of circuit by turning off the respective series-connected secondary switching elements 66. In this instance, each limb portion 58 directly connected to the ungrounded DC terminal 48 must be sufficiently rated to withstand the voltage difference between the ungrounded DC terminal and the alternating voltage appearing at the respective AC terminal 50.

Both sets of limb portions may also be operated to form both the first and second static synchronous compensator having a star configuration, where the grounded DC terminal forms a neutral point of the star configuration of one of the first and second static synchronous compensators and the ungrounded DC terminal forms the neutral point of the star configuration of the other of the first and second static synchronous compensators. In this instance, the auxiliary unit of each limb portion directly connected to the ungrounded DC terminal must be sufficiently rated to withstand the voltage difference between the ungrounded DC terminal and the alternating voltage appearing at the respective AC terminal. To provide the required voltage rating of the limb portion, the auxiliary unit may include additional modules to increase its voltage rating.

In other embodiments, the fault in the DC network may take the form of a grounding of the second DC terminal to a ground terminal of the DC network while the first DC terminal remains ungrounded and thereby continues to carry its operating voltage. In such embodiments, the limb portions may be controllable in use to define the first and/or second three-phase static synchronous compensators.

Figure 11:
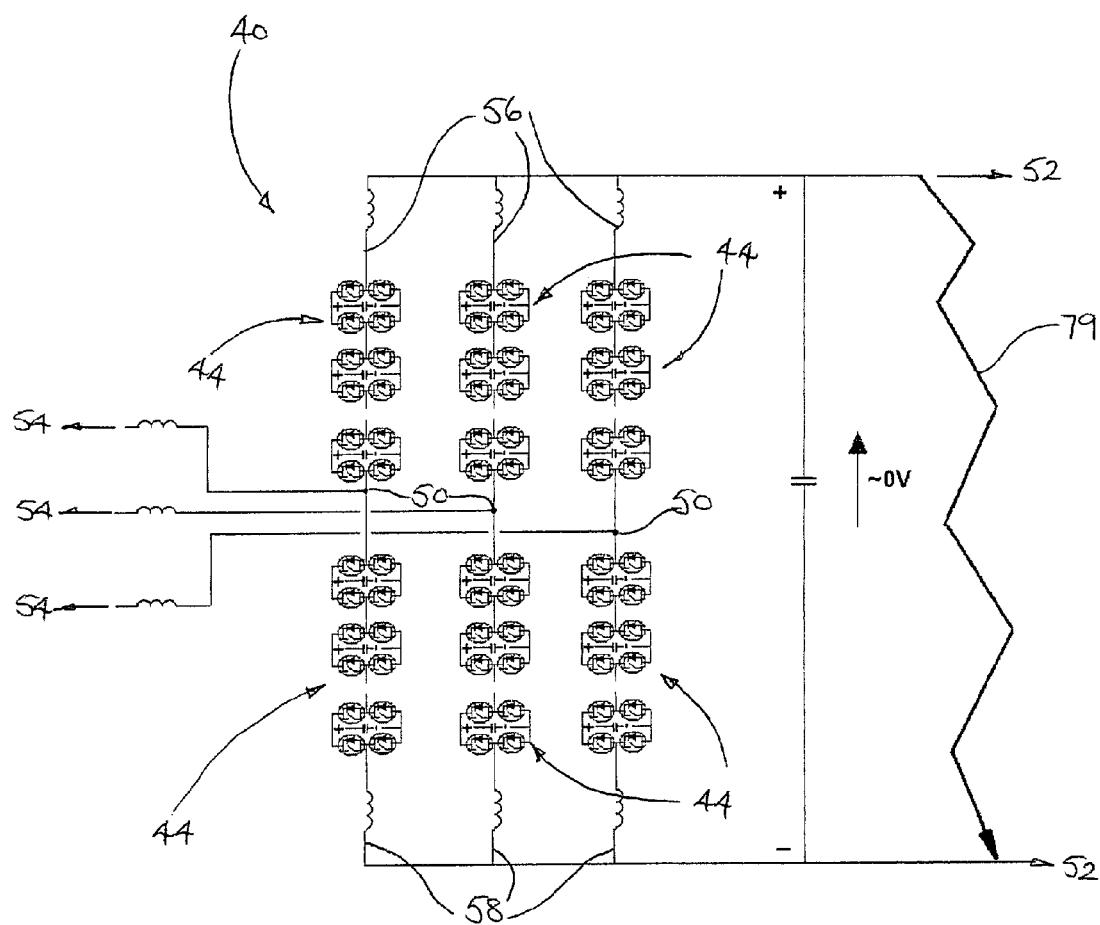
FIG. 11 shows a power electronic converter according to a second embodiment of the invention.

A power electronic converter 40 according to a second embodiment of the invention is shown in FIG. 11. This embodiment is similar to the first embodiment of the power electronic converter 40 except that each limb portion 56,58 of the power electronic converter 40 in FIG. 10 omits the series-connected secondary switching elements.

To define the first three-phase static synchronous compensator, each auxiliary unit 44 of each second limb portion 58 may be operated to generate a voltage waveform to offset the voltage at the respective AC terminal 50 so as to minimise the current flowing through each second limb portion 58.

Similarly, to define the second three-phase static synchronous compensator, each auxiliary unit 44 of each first limb portion 56 may be operated to generate a voltage waveform to offset the voltage at the respective AC terminal 50 so as to minimise the current flowing through each first limb portion 56.

The auxiliary units 44 of the limb portions 56,58 may also be operated to define both first and second three-phase static synchronous compensators.

When the fault in the DC network takes the form of a grounding of one of the first or second DC terminals to a ground terminal and the non-grounded DC terminal remains ungrounded and thereby continues to carry its operating voltage, the auxiliary unit of each limb portion is controllable in use to switch the respective limb portion in and out of circuit to define the first and/or second three-phase static synchronous compensators having a star configuration, where the grounded and/or ungrounded DC terminals define the neutral point of the respective star configuration.

The operation of the auxiliary units 44 of the first and second three-phase static synchronous compensators in the second embodiment of the invention is the same as the operation of the auxiliary units 44 of the first and second three-phase static synchronous compensators in the first embodiment of the invention.

Figure 12:
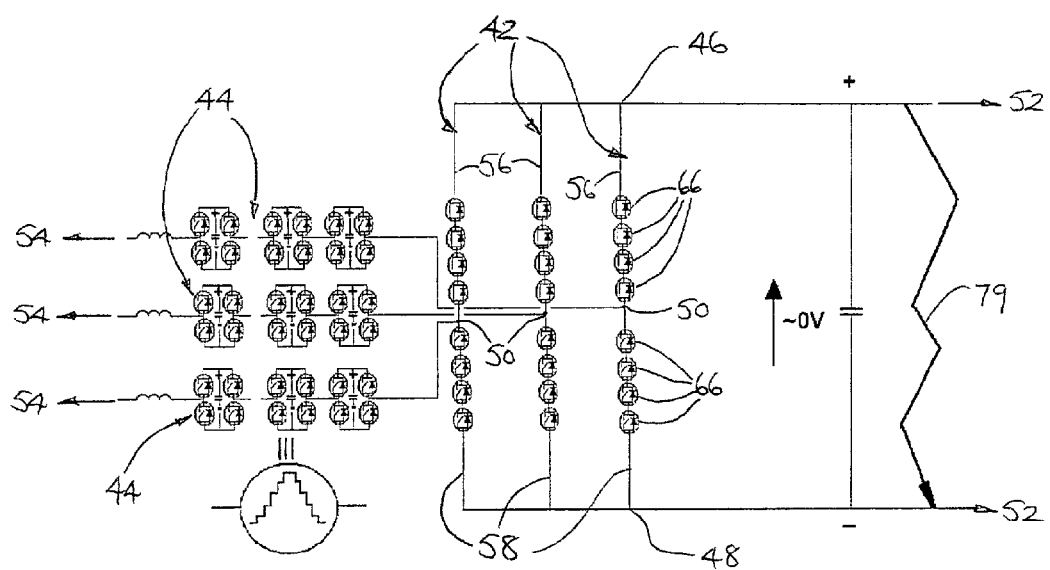
FIG. 12 shows a power electronic converter according to a third embodiment of the invention.

A power electronic converter 40 according to a third embodiment of the invention is shown in FIG. 12. This embodiment is similar to the first embodiment of the power electronic converter 40 except that each limb portion 56,58 of the power electronic converter 40 in FIG. 11 omits the auxiliary units.

The power electronic converter 40 in FIG. 11 further includes one of the plurality of auxiliary units 44 connected to the AC terminal 50 of the respective converter limb 42 for connection in use between the respective converter limb 42 and the AC network 54.

To define the first three-phase static synchronous compensator, the secondary switching elements 66 of the first and second limb portions 56,58 are respectively turned on and off. This results in the formation of the first three-phase static synchronous compensator having a star configuration, in which each auxiliary unit 44 connected to each AC terminal 50 is located in the respective branch of the star configuration and the first DC terminal 46 defines a neutral point of the star configuration.

To define the second three-phase static synchronous compensator, the secondary switching elements 66 of the first and second limb portions 56,58 are respectively turned off and on. This results in the formation of the second three-phase static synchronous compensator having a star configuration, in which each auxiliary unit 44 connected to each AC terminal 50 is located in the respective branch of the star configuration and the second DC terminal 48 defines a neutral point of the star configuration.

To define both first and second three-phase static synchronous compensators, the secondary switching elements 66 of the first and second limb portions 56,58 are turned on. This results in the formation of both the first and second three-phase static synchronous compensator having a star configuration, in which each auxiliary unit 44 connected to each AC terminal 50 is located in the respective branch of the star configuration and the first and second DC terminals 46,48 defines a neutral point of the respective star configuration.

This arrangement minimises the number of auxiliary units 44 required to define the first and/or second three-phase static synchronous compensator with the first and/or second DC terminals 46,48 as the neutral point of the respective star configuration and thereby reduces hardware size, weight and costs.

The operation of the auxiliary units 44 of the first and second three-phase static synchronous compensators in the third embodiment of the invention is the same as the operation of the auxiliary units 44 of the first and second three-phase static synchronous compensators in the first embodiment of the invention.

When the fault in the DC network takes the form of a grounding of one of the first or second DC terminals to a ground terminal and the non-grounded DC terminal remains ungrounded and thereby continues to carry its operating voltage, the secondary switching elements of the limb portions may be controllable in use to turn on or off to switch the respective limb portion in and out of circuit to define the first and/or second three-phase static synchronous compensators having a star configuration, where the grounded and/or ungrounded DC terminals define the neutral point of the respective star configuration.

In embodiments of the invention, when both the first and second three-phase static synchronous compensators are formed, the switching operation of the auxiliary units of the first and second three-phase static synchronous compensators may be synchronised when generating the AC voltage waveforms to enable the voltages at the first and second DC terminals, i.e. the respective neutral points of the first and second three-phase static synchronous compensators, to be approximately equal so as to minimise the voltage differential appearing across the DC network.

In other embodiments, the limb portions may be controllable in use to alternately define the first and second three-phase static synchronous compensators in a 50:50 duty cycle.

The first and/or second static synchronous compensators may be controllable in use to provide power to the DC network in the event of a fault, in use, in the DC network.

Providing power to a fault site in the DC network not only allows an operator to determine the location of the fault in the DC network but also to allow protective equipment associated with the DC network to function properly.

In further embodiments, the power electronic converter may further include a three-phase transformer including a plurality of windings in a star configuration operably connected to each AC terminal for connection in use between the respective converter limb and the AC network.

Figure 13:
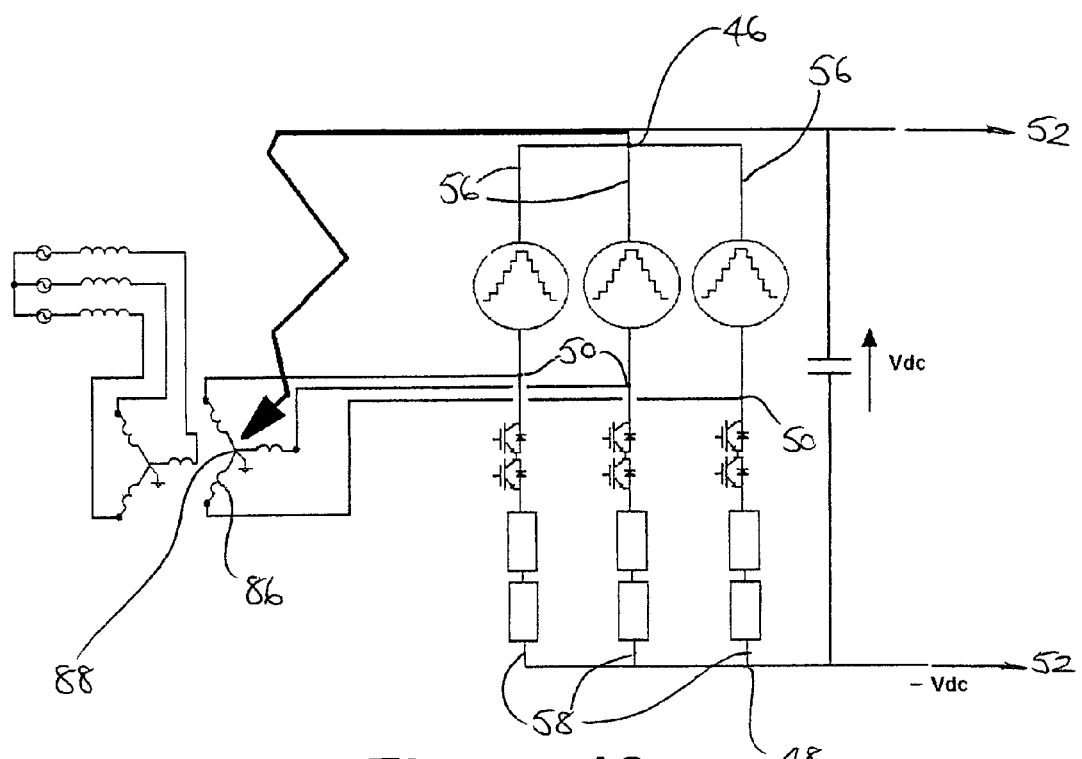
FIG. 13 shows the connection of the first DC terminal of the power electronic converter of FIG. 4 to a neutral point of a plurality of windings of a transformer.

As shown in FIG. 13, the provision of a plurality of windings 86 in a star configuration allows the first DC terminal 46 to be grounded by virtue of being connected to the neutral point 88 of the star configuration of the plurality of windings 86. The limb portions 56 directly connected to the grounded DC terminal 46 may therefore be controlled to define the first static synchronous compensator. In this instance, the ungrounded DC terminal 48 will carry a voltage equal to the operating voltage of the DC network 52. This means that the limb portions 58 connected directly to the ungrounded DC terminal 48 must be sufficiently rated to withstand the voltage difference between the voltage at the ungrounded DC terminal 48 and the alternating voltage at the respective AC terminal 50.

It is envisaged that in other embodiments, the second DC terminal may be grounded by virtue of being connected to the neutral point of the star configuration of the plurality of windings and the limb portions directly connected to the grounded DC terminal may be controlled to define the second static synchronous compensator while the first DC terminal remains ungrounded.

In further embodiments, each energy storage device of each module may be controllable in use to adjust its voltage output. For example, the voltage output of each energy storage device may be increased to allow the converter to generate a voltage waveform of higher magnitude than the AC network so as to provide leading reactive power. This removes the need to include additional modules in each auxiliary unit, which are only required to increase the magnitude of the voltage waveform but remain unused during power conversion between the AC and DC networks. This therefore leads to reductions in hardware size, weight and costs.

The invention claimed is:

1. A power electronic converter for use in high voltage direct current power transmission and reactive power compensation comprising three converter limbs, each converter limb including first and second DC terminals for connection in use to a DC network and an AC terminal for connection in use to a respective phase of a three-phase AC network, each converter limb defining first and second limb portions being connected in series between the respective AC terminal and a respective one of the first and second DC terminals, each limb portion including at least one switching element and at least one auxiliary unit (44) controlled in use to facilitate power conversion between the AC and DC networks each auxiliary unit including at least one chain-link module (60) capable of generating a bidirectional voltage and conducting a bidirectional current, the first and second limb portions (56, 58) being separately controlled in use to form two independent three-phase voltage sources of variable magnitude and phase angle, to define at least one three-phase static synchronous compensator including at least one of the plurality of the auxiliary units (44) in each branch of a star configuration, each of the first and/or second DC terminals (46, 48) defining the neutral point of the respective star configuration.

2. A power electronic converter (40) according to claim 1, wherein the first and second limb portions (56, 58) are controllable in use to simultaneously define first and second three-phase static synchronous compensators.

3. A power electronic converter (40) according to claim 2, wherein each auxiliary unit (44) of the first and second three-phase static synchronous compensators is controllable in use to synchronise the operation of the first and second static synchronous compensators.

4. A power electronic converter (40) according to claim 1, wherein the first and second limb portions (56, 58) are controlled in use to alternately define the first and second three-phase static synchronous compensators.

5. A power electronic converter (40) according to claim 4, wherein the first and second three-phase static synchronous compensators are defined in a 50:50 duty cycle.

6. A power electronic converter (40) according to claim 1, wherein each auxiliary unit (44) of the or each three-phase static synchronous compensator is controlled in use to generate a voltage waveform in the respective branch of the star configuration having a phase angle displacement of 120 electrical degrees with respect to the voltage waveforms generated by the other auxiliary units of the respective three-phase static synchronous compensator.

7. A power electronic converter (40) according to claim 6 wherein each generated voltage waveform is a near approximation of a sinusoid waveform.

8. A power electronic converter (40) according to claim 1, wherein each chain-link module (60) includes: a voltage source in the form of at least one energy storage device; and at least one primary switching element to switch the or each energy storage device in and out of circuit.

9. A power electronic converter (40) according to claim 8, wherein each chain-link module (60) includes two pairs of primary switching elements connected in parallel with an energy storage device to define a 4-quadrant bipolar module that provides negative, zero or positive voltage and can conduct current in two directions.

10. A power electronic converter (40) according to claim 1, wherein each auxiliary unit includes a plurality of modules connected in series to define a chain-link converter.

11. A power electronic converter (40) according to claim 8, wherein the or each primary switching element of each module of each chain-link converter is controlled in use to switch the respective energy storage device in and out of circuit so that the chain-link converter provides a stepped variable voltage source.

12. A power electronic converter (40) according to claim 1, wherein each limb portion (56, 58) includes at least one secondary switching element connected in series between the respective AC terminal and the DC terminal connected to the respective limb portion.

13. A power electronic converter (40) according to claim 1, wherein one of the plurality of auxiliary units is connected to the AC terminal of the respective converter limb for connection in use between the respective converter limb and the AC network.

14. A power electronic converter (40) according to claim 1, wherein each limb portion 56, 58 includes one of the plurality of auxiliary units (44).

15. A power electronic converter (40) according to claim 12 wherein each limb portion (56, 58) includes at least one secondary switching element connected in series with the respective auxiliary unit of the limb portion.

16. A power electronic converter (40) according to claim 15 wherein the auxiliary unit of each limb portion is controlled in use to provide a voltage so as to minimise the voltage across the or each secondary switching element of the respective limb portion.

17. A power electronic converter (40) according to claim 1, wherein the or each switching element of each limb portion is controllable in use to switch the respective limb portion into or out of circuit so as to define the or each three-phase static synchronous compensator.

18. A power electronic converter (40) according to claim 12, wherein the or each secondary switching element of each limb portion is controlled in use to turn on or turn off so as to define the or each three-phase static synchronous compensator.

19. A power electronic converter (40) according to claim 1, wherein each switching element includes at least one semiconductor device.

20. A power electronic converter (40) according to claim 19, wherein the or each semiconductor device is an insulated gate bipolar transistor, a field effect transistor, a gate turn-off thyristor, a gate commutated thyristor, an insulated gate commutated thyristor or an integrated gate commutated thyristor.

21. A power electronic converter (40) according to claim 19, wherein the or each semiconductor device is connected in parallel with an anti-parallel diode.

22. A power electronic converter (40) according to claim 8 wherein, each energy storage device includes a capacitor, a fuel cell, a battery, a photovoltaic cell or an auxiliary AC generator with an associated rectifier.

23. A power electronic converter (40) according to claim 8 wherein each energy storage device is controllable in use to adjust its voltage output.

24. A power electronic converter (40) according to claim 8 wherein, the or each switching element of each module is controlled in use to regulate the voltage of the respective energy storage devices.

25. A power electronic converter (40) according to claim 1, wherein the or each three-phase static synchronous compensator is controlled in use to exchange reactive power with the AC network.

26. A power electronic converter (40) according to claim 25 wherein the or each three-phase static synchronous compensator is controllable in use to provide lagging or leading reactive power to the AC network.

27. A power electronic converter according to claim 1 wherein the or each three-phase static synchronous compensator is controllable in use to provide power to the DC network in the event of a fault, in use, in the DC network.

28. A power electronic converter according to claim 1 further including a three-phase transformer including a plurality of windings in a star configuration operably connected to each AC terminal for connection in use between the respective converter limb and the AC network.

\* \* \* \* \*